UNITED STATES PATENT OFFICE.

RUSSELL S. PENNIMAN, JR., AND NORMAN M. ZOPH, OF BERKELEY, CALIFORNIA, ASSIGNORS, BY MESNE ASSIGNMENTS, TO NATIONAL FERRITE COMPANY, A CORPORATION OF NEW YORK.

PROCESS OF MANUFACTURING IRON COMPOUNDS AND PRODUCT.

1,368,748.     Specification of Letters Patent.     Patented Feb. 15, 1921.

No Drawing.     Application filed January 5, 1920. Serial No. 349,582.

*To all whom it may concern:*

Be it known that we, (1) RUSSELL S. PENNIMAN, Jr., and (2) NORMAN M. ZOPH, citizens of the United States, residing at (1) Berkeley, (2) Berkeley, in the county of (1) Alameda, (2) Alameda, and State of (1) California, (2) California, have invented certain new and useful Improvements in Processes of Manufacturing Iron Compounds and Product, of which the following is a specification.

The present invention relates to the manufacture of iron compounds and especially to such compounds as are suitable for use as pigments, or for the preparation of pigments as by calcining, burning, etc.

In our application Serial No. 175,837, filed June 20, 1917, Patent No. 1,327,061, dated January 6, 1920, (of which this is a contiuation in part) we have described a cyclic process of producing iron compounds of this class by immersing metallic iron in a solution of a soluble ferrous or ferric salt such as the chlorid or sulfate, and introducing an oxidizing agent, an elevated temperature being maintained during the reaction. Thereby the ferrous solution is oxidized to the ferric condition, the desired hydrated product being precipitated, and immediately the ferric salt is reduced by the immersed iron to the ferrous state, this ferrous solution being again oxidized to the ferric condition; the cyclic operation continuing as long as metallic iron is present and the oxidizing agent is supplied.

The result of the immediate reduction of the ferric salt by the immersed iron is the establishment of an equilibrium condition as between the ferrous and ferric contents of the solution, the ferrous component very greatly predominating, so that the solution is maintained substantially in the ferrous state throughout the operation.

This process produces a compound which is very useful and quite satisfactory for some purposes, but the product is likely to occur in the form of comparatively coarse particles which are possibly of chrystalline structure, and the physical properties of which, notably the density and color tone, are such as to impair the value of the product as a pigment.

We have now discovered that by modifying in certain respects the conditions under which the cycle of steps is initiated, a much superior compound having certain highly desirable characteristics can be obtained.

More specifically, we have found that if, instead of starting the process with a clear solution of ferrous or ferric salt, in accordance with our previous application, we disseminate throughout the solution at the outset a colloidal hydrate, the hydrated product precipitated in the course of the process assumes a certain physical condition and possesses certain physical properties which render the same of maximum value as a pigment.

The improved process may be carried out as follows: A colloidal precipitate of ferric hydrate is prepared. This may be effected by the oxidation of colloidal ferrous hydrate precipitated from a soluble ferrous salt with lime or some other suitable alkaline agent, or by the direct precipitation of colloidal ferric hydrate from a soluble ferric salt, or the colloidal hydrate may be prepared in any other suitable manner. With this colloidal ferric hydrate is mixed, conveniently in the same tank in which the hydrate is prepared, a solution of ferrous or ferric sulfate. Metallic iron is then immersed in the bath, the temperature of which is, preferably maintained at about 60° C., and an oxidizing agent such as air is introduced, whereupon the cycle of operation proceeds in the manner described in our earlier application—the iron solution being alternately reduced and oxidized by the metal and air, respectively, in a continuous cycle manner with the resulting maintenance of equilibrium conditions as long as the metal and oxidizing agent are present and the temperature-elevation of the solution is maintained, ferric hydrate or hydrated ferric oxid being thrown out during each oxidation phase of the cycle.

The introduction of the nucleal colloidal ferric hydrate during the initial stages of the process has the effect of retarding or preventing the crystalline formation of the precipitated ferric hydrate, or at least of determining the precipitation of the material in a physical form of superior pigment-value.

The bath or solution of soluble iron salt containing colloidal ferric hydrate and immersed metallic iron is maintained at such elevated temperature during the introduction of oxidizing agent as to insure effective operation of the process.

The proportion of ferric hydrate (introduced and disseminated through the solution of the iron salt), to iron salt solution may vary through a broad range, but very satisfactory practical results are obtained when the proportions are in the ratio of one pound of ferric hydrate to from five to twenty gallons of iron salt solution. This range of ratios is merely given as a practical example of good commercial practice, and we do not limit ourselves to said ratios, as the limits are broader than thereby indicated.

We claim:

1. The process of manufacturing iron compounds which comprises immersing metallic iron in a heated solution of a soluble iron salt in the presence of a colloidal iron compound capable of retarding the crystalline formation of iron hydrate, and introducing an oxidizing agent.

2. The process of manufacturing iron compounds which comprises immersing metallic iron in a heated solution of a soluble iron salt in the presence of colloidal ferric hydrate, and introducing an oxidizing agent.

3. The process of manufacturing iron compounds which comprises introducing an oxidizing agent into a heated solution of a soluble iron salt having metallic iron immersed therein and colloidal ferric hydrate mixed therewith.

4. The process of manufacturing iron compounds which comprises immersing metallic iron in a solution of a soluble iron salt having colloidal ferric hydrate disseminated throughout the same, and introducing an oxidizing agent.

5. In the cyclic process of manufacturing iron compounds which consists in immersing metallic iron in a solution of a soluble iron salt at an elevated temperature, and introducing an oxidizing agent, the step which consists in mixing with the solution during the initial stages of the process colloidal ferric hydrate.

6. A process for manufacturing iron compounds suitable for use as pigments, which consists in immersing metallic iron in a solution of a ferrous salt at an elevated temperature, and forcing air through the solution, said solution having colloidal ferric hydrate disseminated therethrough.

7. As a new article of manufacture, an iron compound suitable for pigment purposes, the same being the product obtained by immersing metallic iron in a heated solution of a soluble iron salt having colloidal ferric hydrate mixed therewith and introducing an oxidizing agent.

8. As a new article of manufacture, an iron compound suitable for pigment purposes, the same being a product such as can be obtained by the herein described process which comprises immersing metallic iron in a solution of a soluble iron salt in the presence of a colloidal iron compound and introducing an oxidizing agent.

9. As a new article of manufacture, an iron compound suitable for pigment purposes, the same being a product such as can be obtained by the herein described process comprising immersing metallic iron in a solution of a ferrous salt at an elevated temperature, and forcing air through the solution, said solution having colloidal ferric hydrate disseminated therethrough.

In testimony whereof we affix our signatures.

RUSSELL S. PENNIMAN, Jr.
NORMAN M. ZOPH.